United States Patent [19]

Goswami et al.

[11] 4,343,856

[45] Aug. 10, 1982

[54] POLYMERIC MARKING FILM

[75] Inventors: Jagadish C. Goswami, New City, N.Y.; Whiteford D. Grimes, Weston, Conn.; Richard A. Rehder, Mahopac, N.Y.

[73] Assignee: Stauffer Chemical Company, Westport, Conn.

[21] Appl. No.: 241,869

[22] Filed: Mar. 9, 1981

[51] Int. Cl.$^3$ .................. B32B 27/08; B32B 27/30; C09J 7/02

[52] U.S. Cl. .................. 428/332; 428/334; 428/335; 428/337; 428/339; 428/352; 428/354; 428/355; 428/520

[58] Field of Search .......... 428/40, 339, 355, 332, 428/520, 522, 220, 335, 336, 337, 343, 352, 354, 356, 334

[56] References Cited

U.S. PATENT DOCUMENTS

| | | | |
|---|---|---|---|
| 4,147,853 | 4/1979 | Goswami et al. | 526/278 |
| 4,199,646 | 4/1980 | Hori et al. | 428/355 |
| 4,207,372 | 6/1980 | Sahara | 428/220 |
| 4,210,739 | 7/1980 | Gallagher et al. | 526/325 |
| 4,217,434 | 8/1980 | Koeble | 428/355 |
| 4,223,054 | 9/1980 | Schramer et al. | 428/40 |
| 4,230,753 | 10/1980 | Sheyon | 428/40 |
| 4,248,917 | 2/1981 | Hornibrook et al. | 428/40 |
| 4,282,286 | 8/1981 | Sahara | 428/339 |

OTHER PUBLICATIONS

Business Week, backpage, 6/27/1977.

*Primary Examiner*—William J. Van Balen
*Attorney, Agent, or Firm*—Richard P. Fennelly

[57] ABSTRACT

An inherently pliable polymeric marking film is disclosed which comprises a film component containing an internally plasticized vinyl chloride copolymer resin, a layer of pressure sensitive adhesive and, in preferred embodiments, a release coated protective liner. In certain embodiments, the polymeric marking film is destructible. The marking film has a small degree of shrinkage, shows exceptional conformability to irregular surfaces and has permanence of mechanical properties upon exposure to elevated temperatures.

8 Claims, No Drawings

POLYMERIC MARKING FILM

BACKGROUND OF THE INVENTION

1. Field of the Invention

The present invention is a marking film which is adapted to be used to affix markings or decorations to motor vehicles and other substrates.

2. Description of the Prior Art

Marking films have been used in the past to affix markings or decorations to motor vehicles and other structures. One type of marking film employs formation of the film by a film casting technique in which a conventional vinyl chloride resin is dissolved in a suitable solvent, after which the resulting liquid material is spread out over polished drums, smooth belts, or coated paper which continuously convey the formed film through suitable curing chambers in which the solvents are evaporated and recovered.

It is known to form a marking film using an externally plasticized vinyl chloride polymer or copolymer film. Thus, in U.S. Pat. No. 4,223,054 to K. Schramer et al., a calendered, externally plasticized vinyl film is used in combination with an acrylic pressure sensitive adhesive having high creep and shrinkage resistance.

A more recent example of a marking film is described in U.S. Pat. No. 4,207,372 to M. Sahara which employs a combination of vinyl chloride resin, thermoplastic polyurethane resin, and ethylene/vinyl ester copolymer in the vinyl film to produce a destructible marking film.

SUMMARY OF THE PRESENT INVENTION

The present invention is a marking film comprising a film and an adherent layer of pressure sensitive adhesive on one side of the film. The film contains, as the polymeric component in the film, an internally plasticized vinyl chloride copolymer resin, and it is substantially free of external plasticizer (e.g., less than about 7%, by weight of the film).

DESCRIPTION OF PREFERRED EMBODIMENTS

The marking films of the present invention contain a film and a layer of pressure sensitive adhesive attached to one side of the film. As an optional, though preferred, additional component, a protective release liner is attached to the exposed side of the pressure sensitive adhesive layer remote from the side attached to the film. The release liner protects the adhesive from contamination by undesired foreign substances when the marking film is stored prior to its intended use.

The film component of the marking film can be formed by calendering a suitably prepared film-forming composition to the thickness conventionally used in such products, e.g., from about 50 to about 125 microns. The film typically contains an internally plasticized resin, filler, pigments (if desired), and such functional additives for the calendering process as process aids, stabilizers, lubricants, antioxidants, and the like.

The selected polymer component used in the films of the present invention is an internally plasticized vinyl chloride copolymer resin. For purposes of the present invention, the terminology "internally plasticized" is to be construed as covering copolymers having an agent incorporated in the resin itself during polymerization to provide the needed degree of flexibility to films made containing the copolymer rather than to conventional vinyl chloride polymers or copolymers requiring external plasticizer during resin compounding to achieve such results.

Internally plasticized vinyl chloride copolymer resins suitable for use in the present invention can be formed by polymerizing vinyl chloride monomer in the presence of an effective amount (10% to 50%, by weight) of at least one comonomer which functions as an internal plasticizer. Included within this class are the alkyl acrylates and methacrylates containing up to about 18 carbon atoms in their alkyl moieties, the vinyl esters of carboxylic acids and ethylenically unsaturated dicarboxylic acids, their anhydrides, and their mono- and dialkyl esters containing up to about 20 carbon atoms in their alkyl moieties.

The internally plasticized resin suitable for use in the present invention should have a Tg of from about $-10°$ C. to about 30° C. and should give a vinyl film having a Shore "A" Hardness of about 80 to about 95 when in the absence of functional additives and when no substantial amounts of plasticizer are present.

A preferred internally plasticized copolymer resin for use in the laminate of the present invention is described in U.S. Pat. No. 4,147,853 to J. C. Goswami et al., which is incorporated herein by reference. This copolymer comprises: (1) from about 50% to about 85%, by weight, vinyl chloride; (2) from about 3% to about 47%, by weight, of a $C_6$–$C_{10}$ alkyl acrylate; and from about 47% to about 3%, by weight, of a bis(hydrocarbyl)vinylphosphonate of the formula:

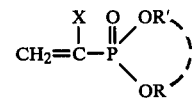

wherein X is selected from the group consisting of hydrogen, halogen, cyano, aryl, such as phenyl, $C_1$–$C_{18}$ alkyl and

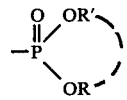

wherein R and R' are hydrocarbyl and substituted hydrocarbyl groups consisting essentially of hydrogen and carbon, and containing up to about 18 carbon atoms, inclusive, with the proviso that R and R' may be the same, different or conjoint, i.e., R and R' may combine to form one single radical.

Preferred weight amounts for the comonomers used to make the copolymer are: (1) from about 55% to about 80%, by weight, vinyl chloride; (2) from about 10% to about 35%, by weight, of the acrylate; and (3) from about 5% to about 25% by weight of the vinylphosphonate. A particularly preferred acrylate is 2-ethylhexyl acrylate, while particularly preferred vinylphosphonates are bis(beta-chloroethyl)vinylphosphonate and bis(2-ethylhexyl)vinylphosphonate.

The aforementioned internally plasticized copolymer can be formed by conventional bulk, emulsion, suspension, or solution polymerization procedures, although suspension polymerization is preferred.

Also useful in the present invention is the internally plasticized resin described in U.S. Pat. No. 4,210,739 to R. E. Gallagher et al. which comprises from about 45% to about 80%, by weight, vinyl chloride, from about 15% to about 54%, by weight, of a $C_2$–$C_{10}$ alkyl acrylate, and from about 10% to about 15%, by weight, of at least one $C_8$–$C_{22}$ dialkyl maleate or fumarate.

The use of the above-described internally plasticized resin allows for production of a film having the desired degree of flexibility without the use of any significant amount of external plasticizer such as employed in certain prior art films. Liquid, external plasticizer tends to migrate from the film into either the adhesive layer or into the air causing such problems as reduction of the adhesion strength of the product or embrittlement of the film. Generally speaking, the amount of internally plasticized resin in the vinyl film can range from about 40% to about 80%, by weight of the film depending upon the type of film required. A clear film, which would not contain filler, would need a higher level of internally plasticized resin.

A number of other additives are used in making the polymeric film component contained in the products of the present invention. Included as potential additives are the following:

(a) fillers and/or pigments. The amount of filler that is chosen can range from about 0% to about 30%, by weight. Fillers and pigments are used to provide desired color to the film to provide opacity and to aid in the calendering of the film forming composition. Representative fillers include such inorganic fillers as titanium dioxide, calcium carbonate, zinc oxide, lead white, gypsum, precipitated silica, carbon black, and red iron oxide. Others are well known to the person of ordinary skill in the art.

(b) monomeric and polymeric process aids. These additives serve to aid in the processing of the calenderable film forming composition as well as give the film favorable visual appearance. Included are such polymeric additives as PVC/acrylate copolymer and chlorinated polyethylene, which produce a smooth surface on the calendered film, and alpha methyl styrene or acrylic polymers which function as a process aid. These additives may be used at from about 2% to about 15%, by weight of the film.

(c) lubricants. These may be present at from about 0.5% to about 3%, by weight of the film. Included as representative lubricants are stearic acid, stearamide, the polyethylene waxes, hydrocarbon oils, and the like.

(d) stabilizers and antioxidants. These may be present at from about 3% to about 10%, by weight of the film. Included are the stearate salts, the epoxidized vegetable oils, dibasic lead phosphite and dibutyl tin dilaurate, dimaleate or mercaptide. Others that may be selected are well known to persons of ordinary skill in the art.

Other functional additives that can be present in relatively minor amount (under 2%, by weight, of the film) include ultraviolet light stabilizers, drying agents, and the like.

The first step in forming the marking film of the present invention, in accordance with a preferred embodiment is the formation of a film forming composition which can be calendered and which has good chemical resistance and outdoor durability. The aforementioned internally plasticized resin, filler and/or pigment, monomeric and polymeric process aid, lubricant, and stabilizers and antioxidant components can be selected in the aforementioned amounts, if desired. These selected ingredients are mixed until they are in the form of a homogeneous powdery composition. They can be then mixed under sufficient heat and pressure to yield a composition of a more fluid consistency. After passing through a strainer apparatus they are ready for calendering.

This film formulation is then calendered at a temperature and pressure which allows formation of a film having a preferred thickness of about 75 microns. A calendering temperature of from about 120° C. to about 160° C. is recommended. This calendered film although possessing good chemical resistance and outdoor durability will not, however, have the dimensional stability desired in the final product of the present invention and should be heat and pressure stabilized. For example, after being heated to a temperature of about 70° C. for about 24 hours, variations in size of up to about 17% in the direction in which the film passes through the calender (machine direction) and up to about 3% in the direction perpendicular to the machine direction (cross direction) can occur.

In order to stabilize the above-described film against variations in size due to such later operations as multipass printings, it is desirable that the calendered film be stabilized by the application of heat and pressure. This stabilization can, if desired, be performed on a machine which comprises a heated drum and series of heated rollers which bring the surface of the film in contact with them, a pressure nip at a relatively lower temperature than the drum and rollers, and cooled idler rollers. The preferred procedure is to pass the film over a heated drum and two heated rollers such that the respective opposed sides of the film are sequentially in contact with the respective drum and rollers. The time of contact, and hence heating by the drum the rollers, is progressively shorter for each successive drum or roller. The total heating procedure takes from about 5 seconds to about 10 seconds. The first drum is heated to a temperature of about 90° C. to about 135° C. with the second and third rollers, which are coated with Telfon ® fluorocarbon, being heated at from about 129.5° C. to about 160° C. The film is then fed through a polished pressure nip having rolls at a temperature of from about 4.4° C. to about 15.6° C. and a nip pressure of about 9.14 to about 11.24 kg./cm². The opposed sides of the film are then sequentially fed over a series of cooled idler rollers at about 4.4° C. to about 15.6° C. and the film is rolled up onto a takeup roll. The maximum width loss of the film at this point can be about 0.80%.

After the film has been heat and pressure stabilized the next step in forming the product of this invention is to coat a suitable release paper with a desired pressure sensitive adhesive. Acrylic pressure sensitive adhesives are a preferred class of adhesive. In general, the same type of adhesives described in U.S. Pat. No. 4,223,054 to K. M. Schramer et al. can be utilized in the vinyl marking films of the present invention.

Typical adhesives include Acrylic Solution Nos. 72-9297 and 72-9283 from National Starch and Chemical Corporation and PS-51 from Ashland Chemical Company. The thickness of the adhesive layer is generally in the neighborhood of 25 microns to 35 microns.

Any conventional release paper can be used in the product of the present invention. Preferred for use is a 90 weight bleached kraft, polyethylene coated release paper having a thickness of from about 154.9 to about 170.2 microns, preferably 162.6–165.1 microns.

The adhesive can be coated onto release paper by reverse roll coating so as to produce an adhesive thickness, when dry, that ranges from about 25.4 to about 38.1 microns, preferably 27.9–33 microns. For the most aesthetic adhesive layer, the adhesive solution should be applied under conditions which will produce a coating which is smooth and of uniform consistency. For the typical adhesives described above, the application can be at a temperature of from about 23.9° C. to about 40.6° C., the viscosity of the solution can range from about 2400 to about 3400 cps. and the solids content can be from about 26% to about 32%. If the initial viscosity is above this range, the adhesive solution can be diluted by adding a suitable dilution agent in the requisite amount. A suitable diluted adhesive solution comprises about 70% to about 80% of the adhesive, about 15% to about 25% of ethyl acetate, and about 2% to about 6% of toluene. The diluted solution is preferably allowed to stand for about 4 hours after said dilution before it is applied by means of conventional reverse roller coating techniques. In order to assure a smooth adhesive coating, the coating head should wipe the application roll clean over its entire width. The adhesive and release paper composite can then be subjected to a three zone drying procedure wherein the first and second drying is at a temperature of about 18.3° C. to about 23.9° C. for about 30 to about 60 seconds, and the third is at a temperature of from about 79.4° C. to about 93.3° C. for about 30 to about 60 seconds. The former first and second drying zones flashes off most of the solvents contained in the adhesive layer, whereas the third dries the residual solvents and cures the polymer.

The adhesive/release paper composite can be laminated to the dull side of the vinyl film at a temperature of about 10° C. to about 21.1° C., preferably about 15.6° C. The tension on the film and adhesive/release paper components can be kept at a minimum during this lamination procedure.

The final product can then be printed with any desired pattern, in either a single pass or in multiple passes without deleterious shrinkage of the film occurring.

Preferred embodiments of the present invention have the typical physical properties described below:

| Propety | Value |
| --- | --- |
| Thickness | 100–125 microns (without release paper) |
| Tensile Strength (min.) | 63.3 kg/cm.$^2$ |
| % Elongation at break | 80–185% |
| Adhesion* (min.) | 715 gm/cm. |
| Shrinkage (unmounted)** | 0.794 mm., max. |

*after 24 hrs. dry mounted to painted steel
**measured from edge of release liner. The value represents the maximum shrinkage in either the machine or cross direction for a film approximately 25.4 × 25.4 mm. It repesents a maximum shrinkage of about 0.3%. The term "substantially dimensionally stable" as used herein should be construed as representing such a degree of maximum shrinkage or less The final product has good screen printability and shows no film degragation, blistering or loss of adhesion after: (1) immersion in water at 32.2° C. for 240 hours; (2) exposure to salt spray for 250 hours; or (3) immersion for 1 hour in a solution of 85% mineral spirits and 15% xylol.

The marking film product of the present invention has a number of desirable characteristics over certain prior art marking film products. Included are: good conformability on an irregular surface resulting from a lowered tendency for elastic behaviour by the marking film product; permanence of certain mechanical properties (e.g., tear strength, tensile strength and elongation characteristics) upon exposure to elevated temperatures giving rise to a long shelf life for the product and, in certain embodiments, good destructibility when an attempt is made to remove the film laminate from a substrate to which it is affixed (i.e., the tensile strength of the film is somewhat less than the force of adhesion).

The present invention is illustrated by the Examples which follow.

EXAMPLE 1

| | FILM NO. Parts by Weight | |
| --- | --- | --- |
| Ingredients | 1 | 2 |
| Internally plasticized vinyl chloride copolymer* | 50.0 | 50.0 |
| Chlorinated polyethylene (Dow Chemical CPE-4213 brand) | 5.0 | — |
| Polyvinyl chloride (SCC-608 brand) | — | 5.0 |
| Alpha-methyl styrene processing aid | 5.0 | 5.0 |
| Tin heat stabilizer | 1.5 | 1.5 |
| Dilauryl thiodipropionate antioxidant | 1.5 | 1.5 |
| Phosphite stabilizer (SYNPRON 1535 brand) | 0.5 | 0.5 |
| Epoxidized soya oil secondary stabilizer (G-62 brand) | 2.5 | 2.5 |
| Titanium dioxide filler (TITANOX 2071 brand) | 27.0 | 27.0 |
| 2-hydroxy-4-n-octoxybenzophenone ultraviolet light stabilizer (UV 531 brand) | 1.0 | 1.0 |
| Bis-stearamide lubricant (ADVAWAX 240 brand) | 0.3 | 0.3 |
| Fumed silica drying agent (CAB-O-SIL M-5 brand) | 0.5 | 0.5 |
| Calcium carbonate filler (ATOMITE brand) | 4.2 | 4.2 |
| Stearic acid lubricant | 1.0 | 1.0 |

*comprises about 75%, by weight, vinyl chloride, about 18%, by weight, 2-ethylhexyl acrylate, and about 7%, by weight, bis(beta-chloroethyl)vinylphosphonate.

The film/adhesive laminate was then formed by laminating the adhesives described below and each of the films described heretofore by the following procedure. The adhesive compositions were placed on clay backed release paper using a double roll coater with a nip adjusted to 30.5 microns. The composite was allowed to air dry for about 2 minutes and it was placed in a 121.1° C. oven for two minutes. It was then allowed to dry for an additional 15 minutes. The film was then applied to the adhesive by means of a hand held hard rubber roller having a width of about 20.3 cm. with a moderate amount of hand pressure. The laminates were then evaluated after removal of the release paper.

The adhesive compositions that were placed on the release paper in the foregoing lamination procedure were as follows:

Adhesive A is a commercially available acrylic pressure sensitive adhesive sold under the trademark 72-9297 by National Starch and Chemical. It has a 30–32%, by weight, solids content and comprises a solvent fraction of 86%, by weight, ethyl acetate and 14%, by weight, toluene.

Adhesive B is a commercially available self-reactive acrylic multipolymer that crosslinks at elevated temperatures. It is sold under the trademark PS-51 by Ashland Chemical Company. It has a percent solids content of 44–45%, a viscosity of 4000–12000 cps. and is in an ethyl acetate, toluene, isopropanol solvent.

EXAMPLE 2

This Example shows the adhesion characteristics when a series of laminates in accordance with the present invention were subjected to a 180° peel adhesion test to stainless steel, Fisher Body painted, and Q-aluminum substrates under various conditions.

Peel adhesion is determined by bonding a portion of a 2.54 cm. wide strip of the laminate to the selected panel using a 2.04 kg. rubber covered roller. The peel adhesion at 180° was then measured after a suitable wet-out or "dwell" period on an INSTRON testing machine as the samples were peeled at the rate of 300 mm./minute.

The Table set forth below shows the adhesion values (in gm/cm.) that was obtained.

STAINLESS STEEL ADHESION

| Film No./ Adhesive | Dwell Time and Temperatures | | | | |
|---|---|---|---|---|---|
| | 20 min. at RT | 24 hrs. at RT | 72 hrs. at RT | 168 hrs. at RT | 168 hrs. at 70° C. |
| 1/A | 268 | 589 | 643 | 554 | 572 |
| 1/B | 393 | 714 | 661 | 679 | 804 |
| 2/A | 321 | 572 | 572 | 536 | 429 |
| 2/B | 411 | 679 | 679 | 643 | 750 |

FISHER BODY PAINTED PANELS

| Film No./ Adhesive | Dwell Time and Temperatures | | | | |
|---|---|---|---|---|---|
| | 20 min. at RT | 24 hrs. at RT | 72 hrs. at RT | 168 hrs. at RT | 168 hrs. at 70° C. |
| 1/A | 447 | 822 | 1036 | 1179[(1)] | 1322[(2)] |
| 1/B | 429 | 839 | 786 | 857 | 839 |
| 2/A | 375 | 768 | 857 | 1161[(1)] | 1304[(3)] |
| 2/B | 411 | 697 | 750 | 768 | 929 |

[(1)] film broke three times.
[(2)] film broke four times.
[(3)] film broke two times

Q-ALUMINUM PANELS

| Film No./ Adhesive | Dwell Time and Temperatures | | | | |
|---|---|---|---|---|---|
| | 20 min. at RT | 24 hrs. at RT | 72 hrs. at RT | 168 hrs. at RT | 168 hrs. at 70° C. |
| 1/A | 179 | 357 | 393 | 321 | 107 |
| 1/B | 268 | 518 | 554 | 429 | 286 |
| 2/A | 196 | 304 | 304 | 268 | 89 |
| 2/B | 304 | 518 | 554 | 625 | 232 |

EXAMPLE 3

The laminates tested in Example 2 were also tested for various physical properties using a number of tests known to the art. The following characteristics and physical values were noted for the tested laminates. All samples were mounted on painted steel panels for a seventy-two hour "wet-out" period prior to testing:

| Film No./ Adhesive | Thickness (microns) | Tensile Str. (1) (MPa) | Elongation (2) (%) | Aged Elongation (3) (%) |
|---|---|---|---|---|
| 1/A | 132.1 | 8.00/5.57 | 102/83 | 116/130 |
| 1/B | 134.6 | 8.00/5.51 | 120/81 | 100/74 |
| 2/A | 116.8 | 8.84/7.79 | 68/33 | 61/40 |
| 2/B | 124.5 | 9.42/7.03 | 67/43 | 79/53 |

(1) the figure before the slash represents tensile strength in a direction parallel to the machine direction (MD) of calendering of the film; the figure after the slash, perpendicular to the direction of calendering, namely, the transverse direction (TD). Sample size - 25 mm. × 150 mm.; crosshead rate - 125 mm./min.; and jaw separation - 75 mm.
(2) the figures represent MD/TD values as received.
(3) the figures represent MD/TD values after oven aging at 70° C. for seven days.

| Film No./ Adhesive | Strip Tensile (4) (MPa) | Abrasion Resist. (5) | Condensation Humidity (6) |
|---|---|---|---|
| 1/A | 7.55/6.23 | OK | OK |
| 1/B | 8.54/5.93 | OK | OK |
| 2/A | 8.54/7.49 | OK | OK |
| 2/B | 9.56/7.03 | OK | OK |

(4) after oven aging at 70° C. for seven days. Represent MD/TD values.
(5) "OK" indicates no surface effects, loss of pattern or wear through after 1000 cycles on a TABER wear tester using a CS17 wheel and a 0.5 kg applied load.
(6) "OK" indicates no surface deterioration, objectionable shrinkage, objectionable color or gloss change, delamination or loss of adhesion after a functionally installed sample is exposed for seven days at 38° C. in a cabinet at 100% relative humidity.

| Film No./ Adhesive | Peel Adhesion (7) (gm/cm.) | Scratch (8) Resistance | Fuel (9) Resistance |
|---|---|---|---|
| 1/A | 1357* | OK | Fail |
| 1/B | 982** | OK | Fail |
| 2/A | 1340* | OK | Slight Effect |
| 2/B | 1018** | OK | Fail |

(7) laminate tested in accordance with condensation humidity test (6). Samples marked * broke four times during testing; those marked **, three times.
(8) "OK" means there are no visible scratches on the surface when tested with a 0.3 kg. load on a GARDNER HOFFMAN hardness tester.
(9) dipped in an 85/15 blend of isooctane and xylol ten times. Effects such as color change, loss of bond and material degradation began taking place after the seventh immersion.

| Film No./ Adhesive | Detergent (10) Resistance | High Temperature Resistance (11) | Heat Aging (12) |
|---|---|---|---|
| 1/A | OK | OK | OK |
| 1/B | OK | OK | OK |
| 2/A | OK | OK | OK |
| 2/B | OK | OK | OK |

(10) "OK" indicates there was no effect on the material when it is immersed in a solution of one part of JOY brand liquid detergent per one hundred parts of water for twenty-four hours.
(11) "OK" indicates there was no blistering, objectionable shrinkage, delamination, or other objectionable observations when the laminate and substrate were exposed to 93° C. for one hour in an air circulating oven.
(12) "OK" indicates no blistering, objectionable color or gloss change, loss of legibility, surface tackiness, crazing, blooming, delamination, objectionable loss of adhesion, or other indication of degradation after one week exposure in an air circulating oven at 70° C. The peel values for samples thus tested (in gm./cm.) were: 1/A - 1144; 1/B - 840; 2/A - 1072; and 2/B - 786.

| Film No./ Adhesive | Salt Spray Test (13) | WEATHEROMETER Apparatus Test (14) |
|---|---|---|
| 1/A | OK | Slight yellowing |
| 1/B | OK | Slight yellowing |
| 2/A | OK | Slight yellowing |
| 2/B | OK | Slight yellowing |

(13) "OK" indicates no loss of adhesion or change in sample appearance after exposure to a 5% by weight concentration of salt in water when sprayed at 35° C. for 200 hours.
(14) Exposed in an ATLAS DMC-R WEATHEROMETER for 1500 hours with a black panel temperature of 68°–70° C. ASTM E 42).

| Film No./ Adhesive | FADEOMETER Apparatus Test (15) | Conformability Test (16) |
|---|---|---|
| 1/A | OK | OK |
| 1/B | OK | OK |
| 2/A | OK | OK |
| 2/B | OK | OK |

(15) "OK" indicates no indication of surface tackiness, objectionable color change, blooming, or blistering after 1000 hours exposure in a FADEOMETER accelerated aging apparatus set at a black panel temperature of 71° ± 3° C. (AATCC Test Method 16-A).
(16) "OK" indicates that no "tenting" or separation of the laminate from the substrate was observed when exposed at room temperature for 168 hours, and exposed at 70° C. for 168 hours.

| Film No./ Adhesive | GRAVELOMETER Apparatus Test (17) |
|---|---|
| 1/A | Fair |
| 1/B | Good |
| 2/A | Fair |

| | -continued | |
|---|---|---|
| 2/B | Fair | |

(17) tested in a GRAVELOMETER apparatus utilizing a 475 cc. container of stones approximately 10 mm. × 16 mm. at 550–690 kilopascals of air pressure. "Fair" indicates few indications of cracking and no evidence of delamination. "Good" indicates no evidence of either cracking or delamination.

All the films were subjected to a two week environmental cycle, as described below:

| | Desired | Film | |
|---|---|---|---|
| Procedure | Effects | 1/A | 1/B |
| 1. 17 hrs. at −30° C. followed by cold crack test | No cracking | Fail | Fail |
| 2. 72 hrs. at 80° C. | No effect | OK | OK |
| 3. 24 hrs. at 38° C. and 100% relative humidity | No effect | OK | OK |
| 4. 7 hrs. at −30° C. followed by cold crack test | No cracking | Fail | Fail |
| 5. 17 hrs. at 38° C. and 100% relative humidity | No effect | OK | OK |
| 6. 7 hrs. at 80° C. | No effect | OK | OK |
| 7. 24 hrs. at 38° C. and 100% relative humidity | No effect | OK | OK |

END 1 WEEK - REPEAT

| | Desired | Film | |
|---|---|---|---|
| Procedure | Effects | 1/A | 1/B |
| 1. 17 hrs. at −30° C. followed by cold crack test | No cracking | OK | OK |
| 2. 72 hrs. at 80° C. | No effect | OK | OK |
| 3. 24 hrs. at 38° C. and 100% relative humidity | No effect | OK | OK |
| 4. 7 hrs. at −30° C. followed by cold crack test | No cracking | Fail | OK |
| 5. 17 hrs. at 38° C. and 100% relative humidity | No effect | OK | OK |
| 6. 7 hrs. at 80° C. | No effect | OK | OK |
| 7. 24 hrs. at 38° C. and 100% relative humidity | No effect | OK | OK |
| 8. 2.54 cm. Peel test (gm./cm.) | 715 (minimum) | 1072 (broke 3×) | 625 |
| 9. GRAVELOMETER test | No cracking or delamination | Fair-Good | Good |

All the films were subjected to a two week environmental cycle, as described below:

| | Desired | Film | |
|---|---|---|---|
| Procedure | Effects | 2/A | 2/B |
| 1. 17 hrs. at −30° C. followed by cold crack test | No cracking | Fail | Fail |
| 2. 72 hrs. at 80° C. | No effect | OK | OK |
| 3. 24 hrs. at 38° C. and 100% relative humidity | No effect | OK | OK |
| 4. 7 hrs. at −30° C. followed by cold crack test | No cracking | Fail | Fail |
| 5. 17 hrs. at 38° C. and 100% relative humidity | No effect | OK | OK |
| 6. 7 hrs. at 80° C. | No effect | OK | OK |
| 7. 24 hrs. at 38° C. and 100% relative humidity | No effect | OK | OK |

END 1 WEEK - REPEAT

| | Desired | Film | |
|---|---|---|---|
| Procedure | Effects | 2/A | 2/B |
| 1. 17 hrs. at −30° C. followed by cold crack test | No cracking | Fail | OK |
| 2. 72 hrs. at 80° C. | No effect | OK | OK |
| 3. 24 hrs. at 38° C. and 100% relative humidity | No effect | OK | OK |
| 4. 7 hrs. at −30° C. followed by cold crack test | No cracking | Fail | OK |
| 5. 17 hrs. at 38° C. and 100% relative humidity | No effect | OK | OK |
| 6. 7 hrs. at 80° C. | No effect | OK | OK |
| 7. 24 hrs. at 38° C. and 100% relative humidity | No effect | OK | OK |
| 8. 2.54 cm. Peel test (gm./cm.) | 715 (minimum) | 894 (broke 3×) | 661 |
| 9. GRAVELOMETER test | No cracking or delamination | Fair-Good | Fair-Good |

With all four films no effects and less than 1.59 × 1.59 mm. shrinkage was noted after the full environmental cycle prior to the peel test.

EXAMPLE 4

This Example illustrates a procedure for making an article in accordance with the present invention on commercial plant equipment.

A calenderable film-forming composition was formed, as described in greater detail below, by blending the following ingredients:

| Ingredients | Weight Percentage |
|---|---|
| Internally Plasticized Resin* | 50.00 |
| Pigment | 22.00 |
| Chlorinated Polyethylene process aid (CPE 4211 brand) | 5.00 |
| Acrylic process aid (K-120N brand) | 5.00 |
| Alpha methyl styrene processing aid (AMOCO 18-210 brand) | 4.50 |
| Calcium carbonate | 4.20 |
| Epoxidized soyabean oil secondary stabilizer (G-62 brand) | 2.50 |
| Dibutyl tin mercaptide stabilizer (THERMOLITE 31 brand) | 2.00 |
| Stearic acid lubricant | 1.00 |
| 2-hydroxy-4-n-octoxybenzophenone ultraviolet light stabilizer | 1.00 |
| Dilaurylthiodipropionate (DLTDP) | 0.75 |
| Butylated hydroxy toluene antioxidant | 0.75 |
| Liquid phosphite heat stabilizer (SYNPRON 1535 brand) | 0.50 |
| Fumed silica drying agent (CAB-O-SIL EH-5 brand) | 0.50 |
| Bis-stearamide lubricant (ADWAX 240 brand) | 0.30 |

*same composition as used in Example 1.

The internally plasticized resin, dilaurylthiodipropionate, butylated hydroxy toluene, and 2-hydroxy-4-n-octoxybenzophenone were added to a ribbon blender and were mixed for ten minutes. Then the epoxidized soyabean oil, dibutyl tin mercaptide and liquid phosphite heat stabilizer were added, and the resulting mixture was mixed for an additional ten minutes. To the resulting mixture was then added the acrylic process aid, alpha methyl styrene, chlorinated polyethylene, calcium carbonate and pigment composition, followed by mixing of the resulting mixture for about 20 minutes. At the end of this period, the bis-stearamide lubricant, the stearic acid, and the silica were added, and mixing was continued for ten additional minutes.

The resulting composition weighing about 77.1 kg., was of powdery consistency and was sent to a mixing apparatus (INTERMIX brand) where it was mixed at 60–80 rpm. under a pressure of about 4.92 kg/cm.$^2$ for about 4 minutes to yield a composition of more fluid character. The resulting composition was then processed in an extrusion strainer at about 121°–149° C., and a calenderable, thick ribbon of material was extracted therefrom.

The material was then calendered in a 4-roll, inverted-L-calender to a gauge of about 75 microns. The temperature of the mixture as it passed through the calender machine was progressively reduced from about 150° C. to 140° C. The film at this point had a film shrinkage of 17% when exposed at 70° C. inside an air circulating oven for 24 hours.

The calendered polymer films described above were then heat stabilized by heat treatment in a suitable machine. One side of the film was drawn over a heated drum which was held at a temperature of about 121° C., the opposite side was drawn over a 20.32 cm. heated roller at about 135° C. and the first side was then drawn over a 10.16 cm. heated roller at 154° C. After being treated as described above, the film was passed through an pressure nip where the rolls were at a temperature of about 10° C. under a pressure of about 10.54 kg/cm$^2$. Thereafter, the respective opposite sides of the film were sequentially placed in contact with three idler rolls at a temperature of about 10° C., and the film was then rolled up onto a takeup roll. The film at this point had a shrinkage of −12.5% in the machine direction and +2.5% in the cross direction after this heat stabilization or stress relief procedure.

The adhesive and release paper were then laminated to the film. The acrylic solution, self-crosslinking, pressure sensitive adhesive (Acrylic Solution 72-9297 from National Starch and Chemical Corporation) at a viscosity of between about 2400–3400 cps. and a temperature of about 23.9°–40.6° C. was coated onto 40.8 kg. bleached kraft release paper by reverse roller coating. The adhesive/release paper composite was then subjected to a three-stage drying procedure wherein the first and second drying temperatures were 18.3° C. and the third was 79.4° C. After drying, the composite was then laminated to the dull side of the polymer film at a cooled lamination nip comprising juxtaposed chrome and rubber rolls, each at a temperature of about 10° C. The tension on the film and adhesive/release paper composite was kept to a minimum during this lamination step.

The resulting film/adhesive laminate had the following physical properties:

| Physical Property Tested | Value |
|---|---|
| Unmounted Shrinkage (on Release Paper) (70° C., 24 hours) | 1.59 mm. (MD)* |
| | 0.40 mm. (CD)* |
| Mounted Shrinkage (on Metal Substrate) (70° C., 24 hours) | 0.0156 (MD) |
| | none |
| Painted Panel Adhesion (RT after 24 hours) | 737 gm./cm. |
| Painted Panel Adhesion (RT after 72 hours) | 782 gm./cm. |
| Q-Aluminum Adhesion (RT after 72 hours) | 380 gm./cm. |
| Painted Panel Adhesion (RT after 6 days) | 1117 gm./cm. |
| Corrugated Aluminum Panel Adhesion (RT after 72 hrs.) | 402 gm./cm. |
| Destructibility[1] (2.54 cm. strip) | 1117 gm./cm. (CD) |
| Screen Printability[2] | Very good |
| Screen Printing Ink Adhesion[3] | Very good |
| Gasoline Resistance[4] (AMOCO unleaded, regular) | Passed |
| Conformability to Corrugations | Very good |
| | (1) No lifting after 5 days at 70° C. with 10 min. wet-out. |
| | (2) No lifting after 1 week on rooftop at Anderson, SC (35–51.7° C.) with 24 hour wet-out. |
| Conformability to Rivets | Good |
| | Slight lifting after 2 hours at 70° C. after which no further change for five days. Same results for rooftop exposure. |
| Tensile Strength | 168.7–232 kg./cm.$^2$ (MD) |
| | 140.6 kg./cm.$^2$ (CD) |
| Elongation at Break | 125–185% (MD) |
| | 133% (CD) |

*The abbreviation CD stands for "cross-direction and represents measurements taken in a direction perpendicular to the machine direction (MD) of calendering. The samples for unmounted shrinkage were 254 mm. (MD) × 254 mm. (CD); for mounted, 254 mm. (MD) × 2.54 mm. (CD).
[1]Samples were mounted on painted panels at ambient temperature and aged for 72 hours. If a value is given it indicates the force needed to rupture the specimen upon removal. "No" indicates the sample was removed without rupturing.
[2]The film was printed with a vinyl ink. "Very good" indicates no streaking, bleeding or incompatibility was noted.
[3]Less than 10% of printed area was removeable after being cross hatched with a razor and an attempt was made to lift it with SCOTCH brand tape.
[4]Same as the Fuel Resistance test mentioned in Examples 1–3 using AMOCO unleaded gasoline.

EXAMPLE 5

This Example illustrates a procedure used for making another article in accordance with the present invention on commercial plant equipment.

The same procedure used in Example 4 was employed with the exception that a differing pressure sensitive adhesive was used: (Acrylic Solution 72-9283 from National Starch and Chemical Corporation).

The resulting film/adhesive laminate had the following selected physical properties:

| Physical Property Tested | Value |
|---|---|
| Unmounted Shrinkage (70° C., 24 hours) | 0.99 mm. (MD) |
| | 0.40 mm. (CD) |
| Mounted Shrinkage (70° C., 24 hours) | 0.40 mm. (MD) |
| | none (CD) |
| Painted Panel Adhesion | |

-continued

| Physical Property Tested | Value |
| --- | --- |
| (RT after 72 hours) | 603 gm./cm. |
| Q-Aluminum Adhesion | |
| (RT after 72 hours) | 715 gm./cm. |
| Corrugated Aluminum Panel | |
| Adhesion (RT after 72 hours) | 715 gm./cm. |
| Destructibility | |
| (2.54 cm. strip) | No |

EXAMPLE 6

This Example is similar to Example 4 utilizing the adhesive from Example 5 with the following exceptions:

1. The amount of chlorinated polyethylene was 3.00% rather than 5.00%, the acrylic process aid was 4.00%, the alpha methyl styrene was 5.50% and the dibutyl tin mercaptide was 1.00%. In addition, partially oxidized polypropylene lubricant was present at 2.00% and tin laurate stabilizer (STANCLERE TL brand) was present at 1.00%.

2. The tin laurate stabilizer was mixed during the second ten minute mixing step, whereas the partially oxidized polypropylene was mixed during the last mixing step.

3. The composition sent to the INTERMIX brand mixer was 79.4 kg. and the highest temperature in the extrusion strainer was 143° C.

4. The calender rolls were at temperatures ranging from 138° C. to 132° C. and the film had a shrinkage of 7.0% after calendering.

5. The heated drum in the stabilizing machine was at 93.3° C. and the 10.16 cm. heated roller was at 135° C. The film had a shrinkage of 4.0% in the machine direction and −0.6% in the cross direction after heat stabilization.

The resulting polymeric marking film had the following physical properties:

| Physical Property Tested | Value |
| --- | --- |
| Unmounted Shrinkage | |
| (70° C., 24 hours) | 1.63 mm. (MD) |
| | 0.80 mm. (CD) |
| Mounted Shrinkage | 1.98 mm. (MD) |
| (70° C., 24 hours) | none (CD) |
| Painted Panel Adhesion | |
| (RT after 72 hours) | 636.69 gm./cm. |
| Q-Aluminum Adhesion | |
| (RT after 72 hours) | 625.52 gm./cm. |
| Destructibility | |
| (2.54 cm. strip) | No |
| Screen Printability | Very good |
| Screen Priniting Ink | |
| Adhesion | Very good |
| Gasoline Resistance (AMOCO | |
| unleaded, regular) | Passed 20 dips. |
| | Very slightly |
| | pink. |
| Conformability to | |
| Corrugations | Very good |
| | (1) No lifting after 3 |
| | days at 70° C. with 10 |
| | min. wet-out. |
| Conformability to | |
| Rivets | Good |
| | Slight lifting after 1 |
| | hour at 70° C. after |
| | which no further change |
| | for three days. |
| Tensile Strength | 105.47 kg./cm.$^2$ (MD) |
| | 67.99 kg.cm.$^2$ (CD) |
| Elongation at Break | 83–112% (MD) |

-continued

| Physical Property Tested | Value |
| --- | --- |
| | 83–96% (CD) |

EXAMPLE 7

This Example illustrates another procedure for making an article in accordance with the present invention on commercial plant equipment. The same procedure used in Example 6 was used. The adhesive used in Example 4 was employed.

The resulting film/adhesive laminate had the following physical properties:

| Physical Property Tested | Value |
| --- | --- |
| Painted Panel Adhesion | |
| (RT after 72 hours) | 894 gm./cm. |
| Destructibility | |
| (2.54 cm. strip) | Yes |

EXAMPLE 8

This Example is the same as Example 4 utilizing the adhesive from Example 5 with the following exceptions:

1. The amount of internally plasticized resin was 49.00% and the amount of dibutyl tin mercaptide was 1.00. In addition, a tin laurate stabilizer was present at 2.00%.

2. The tin laurate was mixed during the second mixing step.

3. The composition sent to the INTERMIX mixer was 77.11 kg. and the maximum strainer temperature was 152° C.

4. The temperature in the calender ranged from 160° C. to 143° C. and the film shrinkage was 11–14% in the machine direction and 0.6–2% in the cross direction.

5. The 10.16 cm. roller in the stabilizing machine was 143° C. and the 20.32 cm. roller in that machine was 135° C. The film at that point had a shrinkage of 5–8.7% in the machine direction and a maximum shrinkage of 2.0% in the cross direction after stabilization.

The resulting film/adhesive laminate had the following physical properties:

| Physical Property Tested | Value |
| --- | --- |
| Unmounted Shrinkage | |
| (70° C., 24 hours) | 1.17–1.57 mm. (MD) |
| | 0.79 mm. (CD) |
| Mounted Shrinkage | |
| (70° C., 24 hours) | 0.99 mm. (MD) |
| | <0.38 mm. (CD) |
| Painted Panel Adhesion | |
| (RT after 24 hours) | 647.86 gm./cm. |
| Painted Panel Adhesion | |
| (RT after 72 hours) | 759.56 gm./cm. |
| Q-Aluminum Adhesion | |
| (RT after 72 hours) | 692.54 gm./cm. |
| Q-Aluminum Adhesion | |
| (RT after 24 hours) | 647.86 gm./cm. |
| Painted Panel Adhesion | |
| (RT after 6 days) | 614.35 gm./cm. |
| Destructibility (2.54 | |
| cm. strip) | No |
| Screen Printabiliy | OK but shrinks |
| | after 2 hours |
| | at 70° C. |
| Screen Printing Ink | |
| Adhesion | Very good |

-continued

| Physical Property Tested | Value |
|---|---|
| Gasoline Resistance (AMOCO unleaded, regular) | Passed. Very slight pink color for film. |
| Adhesion of Premasking Tape to Film | OK |
| Conformability to Corrugations | Very good (1) No lifting after 5 days at 70° C. with 10 min. wet-out. (2) No lifting after 1 week on rooftop at Anderson, SC (35-51.7° C.) with 24 hr. wet-out. |
| Conformability to Rivets | Good Slight lifting after 2 hours at 70° C. after which no furthe change for 5 days. Same results for rooftop exposure. |
| Tensile Strength at Break | 180.41 kg/cm.$^2$ (MD) 105.47 kg/cm.$^2$ (CD) |
| Elongation at Break | 171% (MD) 92% (CD) |
| Painted Panel Adhesion (72 hrs. at 70° C.) | 692.54 gm/cm. |
| Q-Aluminum Panel Adhesion (72 hrs. at 70° C.) | 580.84 gm/cm. |
| Painted Panel Adhesion (RT - 6 days) | 614.35 gm/cm. |
| Q-Panel Adhesion (RT - 6 days) | 536.16 gm/cm. |

EXAMPLE 9

This illustrates a particularly preferred embodiment of the present invention. The procedure of Example 4 was followed using the adhesive of Example 5 with the following exceptions:

1. The amount of internally plasticized resin was 46.50%, of pigment 26.00%, of acrylic process aid 3.00% and of dibutyl tin mercaptide 1.00%. In addition, tin laurate stabilizer was used at 2.00% and a polyethylene lubricant at 1.50%.

2. A portion of the pigment, calcium carbonate, and acrylic process aid were mixed during the first mixing step for twenty-five minutes. The tin laurate was added in the next mixing step with the remainder of the ingredients added in a third mixing step which took 15 minutes.

3. The weight of the composition fed to the INTER-MIX mixer was 72.57 kg. and the extrusion strainer temperature ranged from 132°–165.6° C.

4. The calender temperature was from 170°–145° C., and the film after calendering had a shrinkage of −16% in the machine direction and +2% in the cross direction.

5. The 20.32 cm. heated roller in the stabilizing machine was at 135° C. whereas the 10.16 cm. roller was at 143.3° C. The film had a shrinkage of 11% in the machine direction and 30 1.0% in the cross direction after heat stabilization.

The polymeric marking film had the following physical properties:

| Physical Property Tested | Value |
|---|---|
| Unmounted Shrinkage (70° C., 24 hours) | 0.14 mm. (MD) 0.51 mm. (CD) |
| Mounted Shrinkage (70° C., 24 hours) | 0.79 mm. (MD) 0.38 mm. (CD) |
| Painted Panel Adhesion (RT after 24 hours) | 625.52 gm./cm. |
| Painted Panel Adhesion (RT after 72 hours) | 659.03 gm./cm. |
| Q-Aluminum Adhesion (RT after 24 hours) | 748.39 (MD)/ 692.54 (CD) gm./cm. |
| Q-Aluminum Adhesion (RT after 72 hours) | 796.28 (MD)/ 737.22 (CD) gm./cm. |
| Painted Panel Adhesion (RT after 6 days) | 1117 gm./cm. |
| Painted Panel Adhesion (72 hrs. at 70° C.) | 781.90 gm./cm. |
| Q-Aluminum Adhesion (72 hrs. at 70° C.) | 603.18 gm./cm. |
| Painted Panel Adhesion (6 days at RT) | 714.88 gm./cm. |
| Q-Aluminum Adhesion (6 days at RT) | 837.75 (MD)/ 804.24 (CD) gm./cm. |
| Destructibility (2.54 cm. strip) | No |
| Screen Printability | Very good |
| Screen Printing Ink Adhesion | Very good* |
| Gasoline Resistance (AMOCO unleaded, regular) | Passed |
| Conformability to Corrugations | Very good (1) No lifting after 5 days at 70° C. with 10 min. wet-out. (2) Slight lifting after 1 week on rooftop at Anderson, SC (35-51.7° C.) with 20 min. wet-out. |
| Conformability to Rivets | Good Slight lifting after 2 hours at 70° C. after which no further change for 5 days. Same results for rooftop exposure. |
| Tensile Strength | 217.96 kg./cm.$^2$ (MD) 135.91 kg./cm.$^2$ (CD) |
| Elongation at Break | 148% (MD) 55% (CD) |

*less than 10% removal of printed area cross hatched with razor and lifted with SCOTCH brand tape.

EXAMPLE 10

This Example illustrates the differences in stretch and elasticity of the marking film product of the present invention which is shown in Example 9 and the type of externally plasticized vinyl marking film described in U.S. Pat. No. 4,223,054 to K. Schramer et al.

Samples of each film product comprising film and adhesive were cut in the approximate shape of a dumbbell. The thicker portions of the dumbbell at either end of the sample were of rectangular shape and were 3.81 cm. in length and 2.54 cm. in width. They were connected to one another by a center portion 40 mm. in length and 1.27 cm. in width. Each sample was suspended vertically and had an 800 gm. weight attached to one of the dumbbell portions and allowed to remain in that position for 20 hours. At the end of this period, the length of each sample was measured to measure the stretch characteristics. After this measurement was made, the weights were removed and the films were allowed to stand for 8 hours. At the end of this period, the films were again measured to determine the length. This is labeled "set" in the following Table.

| Characteristics | Schramer et al. Film | Film of the Present Invention |
|---|---|---|
| Stretch | 42 mm. | 49 mm. |
| Set | 40 mm. | 46 mm. |

The film of the present invention exhibits a higher degree of stretch and a lower degree of elasticity (as determined by the "set" valve) as compared to the Schramer et al. film.

The foregoing Examples illustrate certain embodiments of the present invention and should not be construed in a limiting sense. The scope of protection that is sought is set forth in the claims which follow.

What is claimed is:

1. A polymeric marking film consisting essentially of:
   (a) a film component containing an internally plasticized vinyl chloride copolymer resin; and
   (b) a layer of pressure sensitive adhesive attached to one side of the film.

2. A marking film as claimed in claim 1 where the film component has a thickness of from about 50 to about 125 microns.

3. A marking film as claimed in claim 1 where the internally plasticized resin has a Tg of from about $-10°$ C. to about 30° C.

4. A marking film as claimed in claim 1 where the internally plasticized resin comprises from about 40% to about 80%, by weight of the film component.

5. A marking film as claimed in claim 1 wherein the internally plasticized resin comprises vinyl chloride and from about 10% to about 50%, by weight of at least one plasticizing comonomer.

6. A marking film as claimed in claim 1 where the pressure sensitive adhesive is an acrylic pressure sensitive adhesive.

7. A marking film as claimed in claim 1 where the film component has a thickness of about 50 to about 125 microns, the film component contains from about 40% to about 80%, by weight of the internally plasticized resin which comprises from about 50% to about 80%, by weight, vinyl chloride, from about 3% to about 47%, by weight of a $C_6$–$C_{10}$ alkyl acrylate, and from about 47% to about 3%, by weight, of a bis(hydrocarbyl) vinylphosphonate, and the pressure sensitive adhesive is an acrylic pressure sensitive adhesive.

8. A marking film as claimed in any of claims 1–7 which further comprises a release linear attached to the side of adhesive layer remote from the side attached to the film component.

* * * * *

UNITED STATES PATENT AND TRADEMARK OFFICE
CERTIFICATE OF CORRECTION

PATENT NO. : 4,343,856
DATED : August 10, 1982
INVENTOR(S) : Jagadish C. Goswami et al.

It is certified that error appears in the above-identified patent and that said Letters Patent are hereby corrected as shown below:

Col. 11, line 34, "an pressure nip" should be -- a pressure nip --;

Col. 12, line 39, quotation marks should appear after the word "cross-direction" in line 1 of the footnote;

Col. 15, line 20, "furthe" should be -- further --;

Col. 15, line 64, "30 1.0%" should be --+ 1.0% --;

Col. 17, line 19, "valve" should be -- value --; and

Col. 18, line 28, "linear" should be -- liner --.

Signed and Sealed this

Second Day of November 1982

[SEAL]

Attest:

GERALD J. MOSSINGHOFF

Attesting Officer    Commissioner of Patents and Trademarks